United States Patent
Nagasaka (10) Patent No.: US 7,839,597 B2
(45) Date of Patent: Nov. 23, 2010

(54) INFORMATION ACCESS DEVICE

(75) Inventor: Yoshiyuki Nagasaka, Kawasaki (JP)

(73) Assignee: Toshiba Storage Device Corporation, Tokyo (JP)

( * ) Notice: Subject to any disclaimer, the term of this patent is extended or adjusted under 35 U.S.C. 154(b) by 0 days.

(21) Appl. No.: 12/410,986

(22) Filed: Mar. 25, 2009

(65) Prior Publication Data

US 2009/0244766 A1    Oct. 1, 2009

(30) Foreign Application Priority Data

Mar. 26, 2008    (JP) .............................. 2008-080255

(51) Int. Cl.
*G11B 21/02* (2006.01)
*G11B 5/02* (2006.01)
*G11B 15/18* (2006.01)

(52) U.S. Cl. .............................. 360/75; 360/67; 360/69

(58) Field of Classification Search ........................ None
See application file for complete search history.

(56) References Cited

U.S. PATENT DOCUMENTS 7,180,692 B1 * 2/2007 Che et al. ...................... 360/31
7,508,617 B1 * 3/2009 Mak et al. ...................... 360/75
2006/0139789 A1 6/2006 Yang

FOREIGN PATENT DOCUMENTS

JP    2006-190454    7/2006

* cited by examiner

*Primary Examiner*—K. Wong
(74) *Attorney, Agent, or Firm*—Greer, Burns & Crain, Ltd.

(57) ABSTRACT

A difference value between a gain control value when a head comes into contact with a recording medium and a gain control value when the head floats with respect to the recording medium by a target floating amount is stored in advance. When the information access device is actually operated, supply power to a heater is adjusted to once bring the head into contact with the recording medium, a first gain control value adjusted by a gain control section when the head comes into contact with the recording medium is obtained, a second gain control value to be adjusted by the gain control section when the head floats from the recording medium by the target floating amount is obtained from the first gain control value and the difference value, and the supply power to the heater is adjusted such that the second gain control value is supplied to a gain variable amplifier by the gain control section.

4 Claims, 5 Drawing Sheets

INFORMATION ACCESS DEVICE

CROSS-REFERENCE TO RELATED APPLICATIONS

This application is based upon and claims the benefit of priority of the prior Japanese Laid-open Patent No. 2008-080255, filed on Mar. 26, 2008, the entire contents of which are incorporated herein by reference.

FIELD

The embodiment is related to an information access device which accesses information using a head in which a heater is incorporated and whose floating amount varies according to thermal expansion.

BACKGROUND

In recent years, as information-driven society moves forward, it is desired that an information recording method and an information storage device having remarkably high recording density are developed. Magnetic disk devices which access to information using a magnetic field are information storage devices capable of rewriting information. Among them, a floating head type magnetic disk device in which a head for applying a magnetic field is floated by air flow generated by rotation of a disk is widely used as a compact and high recording density information storage device.

In the floating head type magnetic disk device, if a head comes into contact with a rotating disk, information recorded in the disk is damaged. On the other hand, in order to efficiently apply magnetic field to a disk to enhance the accessing accuracy, it is necessary to bring the head closer to the disk, and a floating amount of a head is reduced to the order of some nm in recent years. Thus, although it is required to float a magnetic head from a disk precisely by a predetermined amount, but in the reality, the floating amounts of magnetic heads are varied respectively due to variations during production.

To solve the problem, a heater is incorporated in a magnetic head, and the magnetic head is thermally expanded by heat of the heater to adjust the floating amount. By supplying power suitable for the magnetic head to the heater, it is possible to adjust the floating amount of each magnetic head to a target floating amount, and to reduce the variations of accessing precision between the devices. As a method for calculating supply power to the heater, Japanese Patent Laid-open Application No. 2006-190454 describes a method for calculating a floating amount of a head using Wallace equation and calculating heater power when the target floating amount is realized. First, information recorded in a magnetic disk is read while varying power to be supplied to a heater, and an AGC gain value when the read signal is amplified by a gain variable amplifier such that the read signal becomes an analog signal of predetermined amplitude is obtained. Next, the obtained AGC gain value is substituted into the Wallace equation shown below, and the floating amount of the head is calculated.

$$\Delta d = (\lambda/2\pi) \times \text{Ln}(T1/T2) \tag{1}$$

Here, $\Delta d$ represents a change of a floating amount of a head, $\lambda$ represents a recording wavelength, $T1$ represents a previous AGC gain value, and $T2$ represent a current AGC gain value.

By repeating changing operation of supply power to the heater, reading of information in the magnetic head, and obtaining of the AGC gain value, a first graph showing a relation between the heater supply power and the AGC gain value is prepared, the AGC gain value in the first graph is substituted into the equation (1), the floating amount of the head is calculated, and a second graph showing a relation between the heater power and the head floating amount is prepared. A heater power value with which the target floating amount can be obtained on the second graph is obtained, and power supplied to the heater is adjusted to the obtained heater power value. With this, the head floating amount can be set to the target floating amount.

According to the method described above, however, since it is necessary to measure waveforms of input/output signals of the gain variable amplifier using an oscilloscope or the like and to obtain the AGC gain value every time when the supply power to the heater is changed, there is a problem that it takes time. Further, it is necessary to convert the obtained AGC gain value into the floating amount of the head every time, and it takes processing time. Since the equation (1) for converting the AGC gain value to the floating amount of the head is for logarithm calculation, there is a problem that the amount of calculation is extremely high and processing load is large.

SUMMARY

According to a first aspect of the present invention,

C1

According to the first aspect of the present invention, since the gain value of the gain variable amplifier is expressed by an exponentially multiplying times of a gain control value, the AGC gain value (T1/T2) term in the equation (1) can be rewritten as following using a gain control value Gn of the gain variable amplifier;

$$T1/T2 = (a \times b^{G1})/(a \times b^{G2}) = b^{(G1-G2)} \tag{2}$$

wherein a and b are constants.

When the equation (2) is substituted into the equation (1), the following equation (3) is obtained:

$$\Delta d = (\lambda/2\pi) \times \text{Ln}(b^{(G1-G2)})$$

$$= (\lambda/2\pi) \times (G1-G2) \times \text{Ln}(b) \tag{3}$$

Here, when the wavelength is constant, $(\lambda/2\pi)$ is a constant, $\text{Ln}(b)$ is also a constant and thus, if $C=(\lambda/2\pi) \times \text{Ln}(b)$, the following equation (4) is obtained:

$$\Delta d = C \times (G1-G2) \tag{4}$$

If the fact that a gain value of the gain variable amplifier is expressed by an exponential function of the gain control value is utilized, a logarithm term in the Wallace equation can be expressed by constant times of a difference of the gain control values, and the logarithm calculation having a great amount of calculations can be saved. When the gain value is utilized, it is necessary to measure input/output signals in the amplifier using an oscilloscope or the like and to obtain the gain value. However, when the gain control value is utilized, the gain control value supplied from the gain control section to the gain variable amplifier can be used as it is, and time for measuring can also be saved.

Further, from the equation (4), it can be found that when differences of floating amounts of heads are the same, differences of gain control values are also same. If a gain control value when the head comes into contact with a recording medium is defined as G1 and a gain control value when the head floats from the magnetic head by a target floating amount is defined as G2, the difference Δd of the floating amount in the equation (4) becomes equal to the target floating amount, and a difference S=(G1−G2) between the gain control values can easily be calculated from the target floating amount Δd. In the first aspect of the invention, the difference S between the gain control values is previously stored, and when the information access device is actually operated, a gain control value to be supplied to the gain variable amplifier is obtained while adjusting supply power to the heater, and if the actually measured value G1' of the gain control value when the head comes into contact with the recording medium is detected, G2'(=G1'−S) of the gain control value when the head floats from the recording medium by the target floating amount is calculated, and power supplied to the heater when the gain control value G2' is obtained is obtained as a heater supply power for realizing the target floating amount is obtained. Thus, according to the first aspect of the invention, it is possible to save time for converting the obtained gain control value into the floating amount of the head, to reduce the processing load, and to calculate the supply power of the heater quickly.

Additional objects and advantages of the invention will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

DESCRIPTION OF EMBODIMENT

Specific embodiment of the first aspect of the invention will be explained with reference to the drawings.

Figure 1:
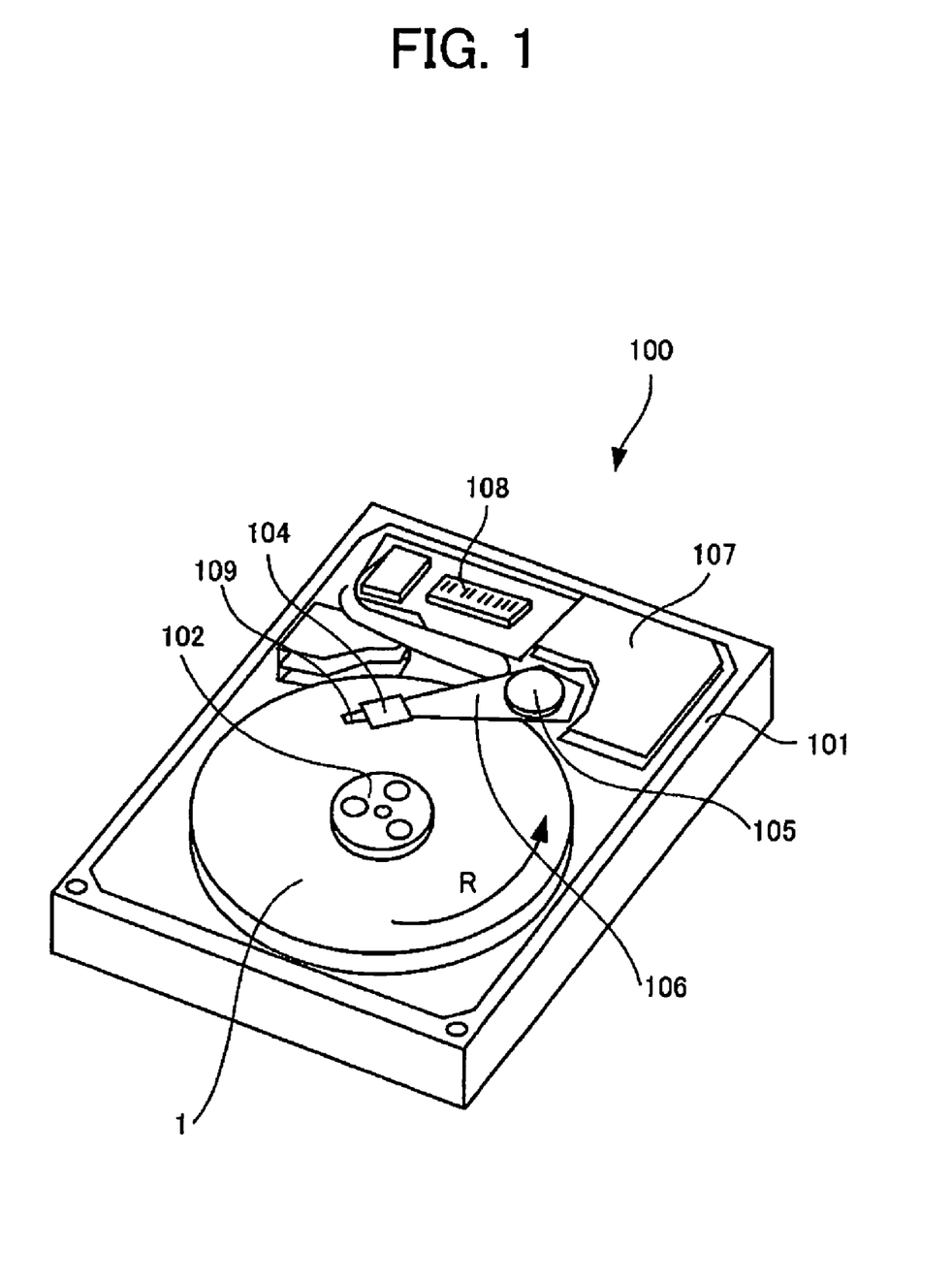
FIG. 1 is a view showing an outer appearance of a hard disk drive.

FIG. 1 is a view showing an outward appearance of a hard disk drive 100.

The hard disk drive 100 is connected to or incorporated in a host device such as a personal computer and utilized.

As shown in FIG. 1, the hard disk drive 100 has a housing 101. Accommodated in the housing 101 are a magnetic disk 1 in which information is recorded, a spindle motor 102 which rotates the magnetic disk 1 in the direction of the arrow R, a floating head slider 104 which comes close to a surface of the magnetic disk 1 and is opposed to the magnetic disk 1, an arm shaft 105, a carriage arm 106 to whose tip end a floating head slider 104 is fixed and which moves on the magnetic disk 1 around the arm shaft 105 along a surface thereof, a voice coil motor 107 which drives the carriage arm 106, and a control circuit 108 which controls the operation of the hard disk drive 100. The magnetic disk 1 corresponds to an example of the recording medium in the information access device described above.

The floating head slider 104 is provided at its tip end with a magnetic head 109 which applies a magnetic field to the magnetic disk 1. The hard disk drive 100 records information on the magnetic disk 1 using the magnetic field, and reads information recorded on the magnetic disk 1. The magnetic head 109 corresponds to an example of the head in the information access device.

Figure 2:
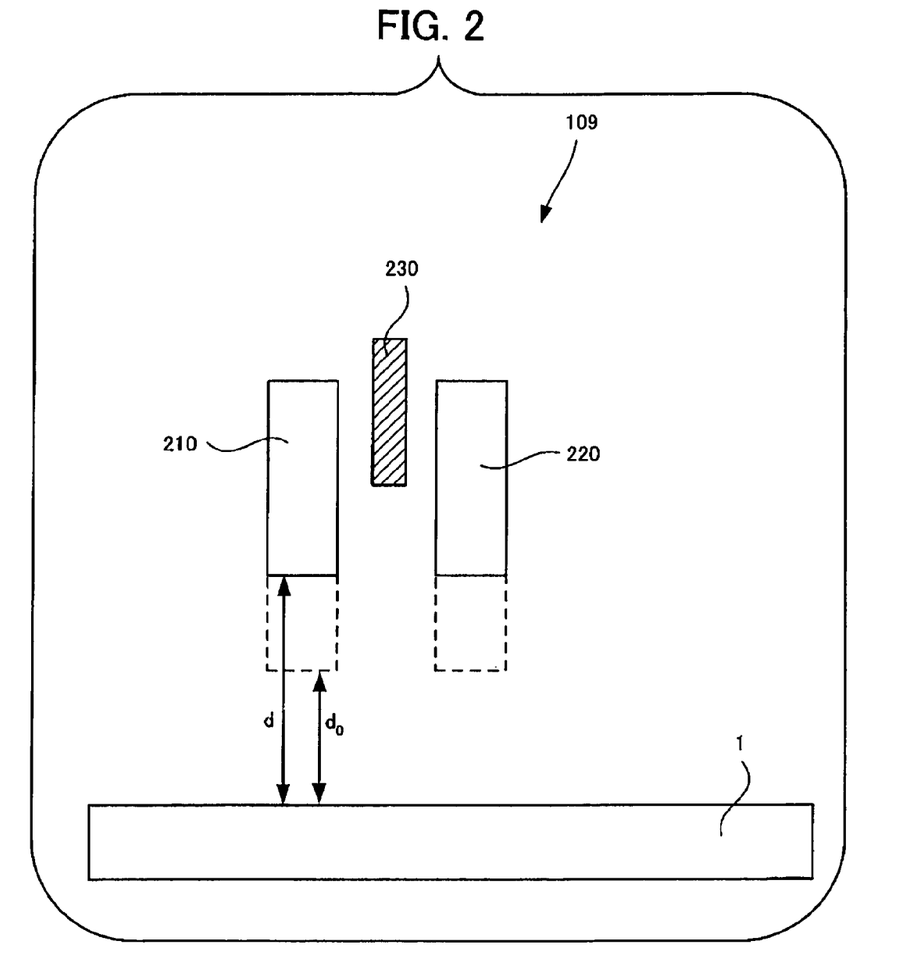
FIG. 2 is a schematic view showing a structure of a magnetic head.

FIG. 2 is a schematic view showing a structure of the magnetic head 109.

The magnetic head 109 includes a recording head 210 which includes a main magnetic pole for generating a magnetic flux and a coil for generating a magnetic field. The recording head 210 writes information on the magnetic disk 1. The magnetic head 109 also includes a reproducing head 220 which reads information recorded on the magnetic disk 1, and a heater 230 for heating the recording head 210 and the reproducing head 220. The magnetic head 109 is required to precisely float from the magnetic disk 1 by a target floating amount d0, but in reality, the floating amounts d1 of the magnetic head 109 are varied respectively due to production variation of the magnetic head 109. In the embodiment, the magnetic head 109 is thermally expanded by heating the same by the heater 230, and the floating amount of the magnetic head 109 is adjusted to the target floating amount d0. The adjusting process of the floating amount of the magnetic head 109 will be explained in detail later.

Figure 3:
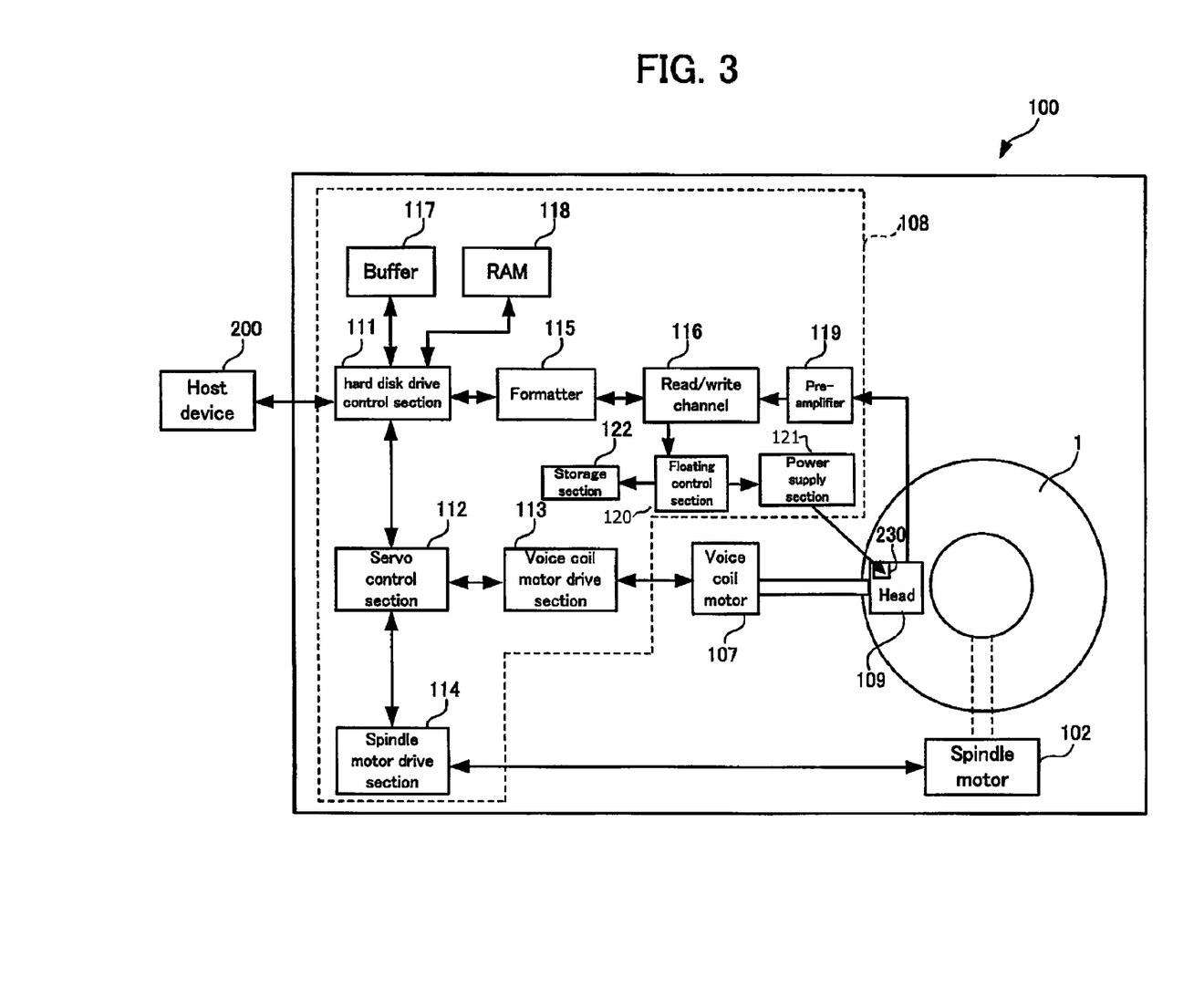
FIG. 3 is a functional block view of the hard disk drive.

FIG. 3 is a functional block view of the hard disk drive 100.

As shown in FIG. 3, the hard disk drive 100 includes the spindle motor 102, the voice coil motor 107, the control circuit 108, the magnetic head 109 in which the heater 230 is incorporated and the like, also shown in FIG. 1. The control circuit 108 includes a hard disk drive control section 111 which controls the entire hard disk drive 100, a servo control section 112 which controls the spindle motor 102 and the voice coil motor 107, a voice coil motor drive section 113 which drives the voice coil motor 107, a spindle motor drive section 114 which drives the spindle motor 102, a formatter 115 which formats the magnetic disk 1, a read/write channel 116 which generates writing current carrying writing information to be written on the magnetic disk 1, and which converts a reproduction signal obtained by reading information recorded on the magnetic disk 1 by the magnetic head 109 into digital data, a buffer 117 used as cache in the hard disk drive control section 111, a RAM 118 used as a working area in the hard disk drive control section 111, a preamplifier 119 which amplifies the reproduction signal which is read by the magnetic head 109, a floating control section 120 which controls power supplied to the heater 230 and controls the floating amount of the magnetic head 109, a storage section 122 which records various parameters used in the floating control section 120, an power supply section 121 which supplies power to the heater 230 and the like. The read/write channel 116 is an example of the read channel in the information access device. The storage section 122 is an example of the difference value recording section in the information access device. The floating control section 120 is an example of the floating amount control section in the information access described above. The power supply section 121 corresponds to an example of the power supply section in the information access device described above.

When information is written on the magnetic disk 1, writing information to be recorded on the magnetic disk 1 and an address of a writing position are sent to the hard disk drive 100 from the host device 200 shown in FIG. 3. The hard disk drive control section 111 informs the servo control section 112 of the address.

Next, power is supplied from the power supply section 121 to the heater 230 according to instructions from the floating control section 120, and the floating amount of the magnetic head 230 is adjusted to the target floating amount. The servo control section 112 sends instructions for rotating the spindle motor 102 to the spindle motor drive section 114, and sends instructions for moving the carriage arm 106 (see FIG. 1) to the voice coil motor drive section 113. The spindle motor drive section 114 drives the spindle motor 102 and rotates the magnetic disk 1, and the voice coil motor drive section 113 drives the voice coil motor 107 and moves the carriage arm 106. As a result, the magnetic head 109 is positioned on the magnetic disk 1.

If the magnetic head 104 is positioned, the hard disk drive control section 111 sends a writing signal to the read/write channel 116, and the read/write channel 116 applies writing current which carries writing information to the magnetic head 109.

In the magnetic head 109, a writing signal is input to the recording head 210 shown in FIG. 2, and a magnetic flux according to the writing signal is emitted toward the magnetic disk 1 by the recording head 210. As a result, magnetization in a direction according to the information is formed on the magnetic disk 1, and the information is recorded on the magnetic disk 1.

When the information recorded on the magnetic disk 1 is read, an address of a recorded position where the information is recorded is sent from the host device 200 shown in FIG. 3 toward the hard disk drive 100. Then, similarly to the time of writing information, power is supplied from the power supply section 121 to the heater 230, a floating amount of the magnetic head 230 is adjusted to a target floating amount, then the spindle motor 102 rotates to drive the magnetic disk 1 to be rotated, the voice coil motor 107 drives the carriage arm 106 to be moved. Accordingly, the magnetic head 109 is positioned on the magnetic disk 1.

In the magnetic head 109, current flows to the reproducing head 220 shown in FIG. 2, and a reproduction signal according to the magnetized state of the magnetic disk 1 is produced. The reproduction signal is converted into digital data in the read/write channel 116 shown in FIG. 3 and then, is sent to the host device 200 through the hard disk drive control section 111.

Basically, the information access device accesses to the information on the magnetic disk 1.

In the hard disk drive 100 in this embodiment, before actually accessing information on the magnetic disk 1, a preparation process for calculating supply power to the heater 230 is operated for adjusting a floating amount of the magnetic head 109 to a target floating amount. This preparation processing will be explained in detail below.

Figure 4:
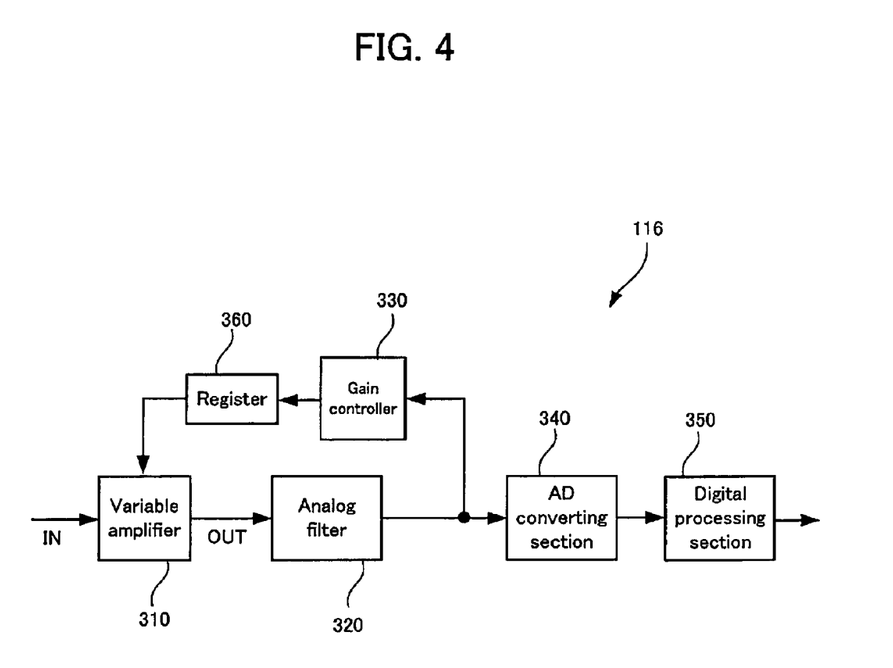
FIG. 4 is a functional block view of a read/write channel.

FIG. 4 is a functional block view of the read/write channel 116.

The read/write channel 116 includes a register 360 in which a gain control value is registered, a variable amplifier 310 in which information recorded on the magnetic disk 1 by the magnetic head 109 is read and an input signal IN amplified by the preamplifier 119 is multiplied exponentially by times of the gain control value G registered in the register 360 to produce an output signal OUT, an analog filter 320 for removing noise in the output signal OUT, a gain controller 330 which calculates a gain control value for amplifying the input signal IN to the output signal OUT with a predetermined amplitude and registers the same in the register 360, an AD converting section 340 for converting the analog signal to a digital signal, and a digital processing section 350 which subjects read data converted to a digital signal to various signal processing. The input signal IN which is input to the read/write channel 116 is amplified to the output signal OUT of the predetermined amplitude in accordance with an equation (5) using the gain control value G and constants a and b registered in the register 360.

$$\text{Output Signal OUT} = \text{Input Signal IN} \times a \times b^G \quad (5)$$

The gain controller 330 is an example of the gain control section in the information access device. The variable amplifier 310 is an example of the variable amplifier in the information access device. The AD converting section 340 is an example of an A/D converter in the information access device.

The floating control section 120 shown in FIG. 3 calculates a difference S between a gain control value G1 which is adjusted by the gain controller 330 when the magnetic head 109 is located beforehand in a reference position d1 where the magnetic head 109 comes into contact with the magnetic disk 1 and a gain control value G2 which is adjusted by the gain controller 330 when the magnetic head 109 is in the target position d2 floating from the magnetic disk 1 by the target floating amount D. As show in the equation (5), since the gain value T in the variable amplifier 310 is expressed by exponentially multiplying times ($a \times b^G$) of the gain control value G, it can be expressed as follows from the equation (1):

$$D = d1 - d2 = (\lambda/2\pi) \times \text{Ln}(b^{(G1-G2)})$$

$$= (\lambda/2\pi) \times \text{Ln}(b) \times (G1-G2) \quad (6)$$

wherein, $\lambda$ represents recording wavelength.

From the equation (6), it can be found that under the condition that the recording wavelength $\lambda$ is same, if the difference between the floating amounts is same, the difference between the gain control values is also same. In the floating control section 120, a difference S=(G1−G2) between the gain control values in the reference position d1 and that in the target position d2 is calculated in advance for each recording wavelength $\lambda$, and is stored in the storage section 122.

When the hard disk drive 100 is actually delivered to a user, power to be supplied to the heater 230 is calculated before the hard disk drive 100 is actually operated.

When instructions are given from the floating control section 120 to the power supply section 121, a predetermined amount of power is supplied from the power supply section 121 to the heater 230.

When power is supplied to the heater 230, the magnetic head 109 is thermally expanded and the floating amount of the magnetic head 109 is varied. In this state, the information recorded on the magnetic disk 1 is read by the magnetic head 109, a read signal is input to the read/write channel 116 through the preamplifier 119.

In the read/write channel 116, a gain control value is calculated by the gain controller 330, and the calculated gain control value is registered in the register 360. The input signal IN which is input to the read/write channel 116 is amplified to the output signal OUT having a predetermined amplitude using the gain control value registered in the register 360 in the variable amplifier 310. At this time, in the floating control section 120 shown in FIG. 3, the gain control value registered in the register 360 is obtained, and the gain control value and supply power to the heater 230 are associated with each other. In this embodiment, since not a gain value but the gain control value is utilized, the gain control value which was registered in the register 360 by the gain controller 330 can be used as it is, and time for measuring the input/output signals of the variable amplifier 310 to obtain the gain value using the oscilloscope or the like can be saved.

In addition, the supply power supplied from the power supply section 121 to the heater 230 is incremented by a predetermined amount, reading information through the magnetic head 109, controlling the gain control value through the gain controller 330, and the gain control value are associated with supply power to the heater 230.

Figure 5:
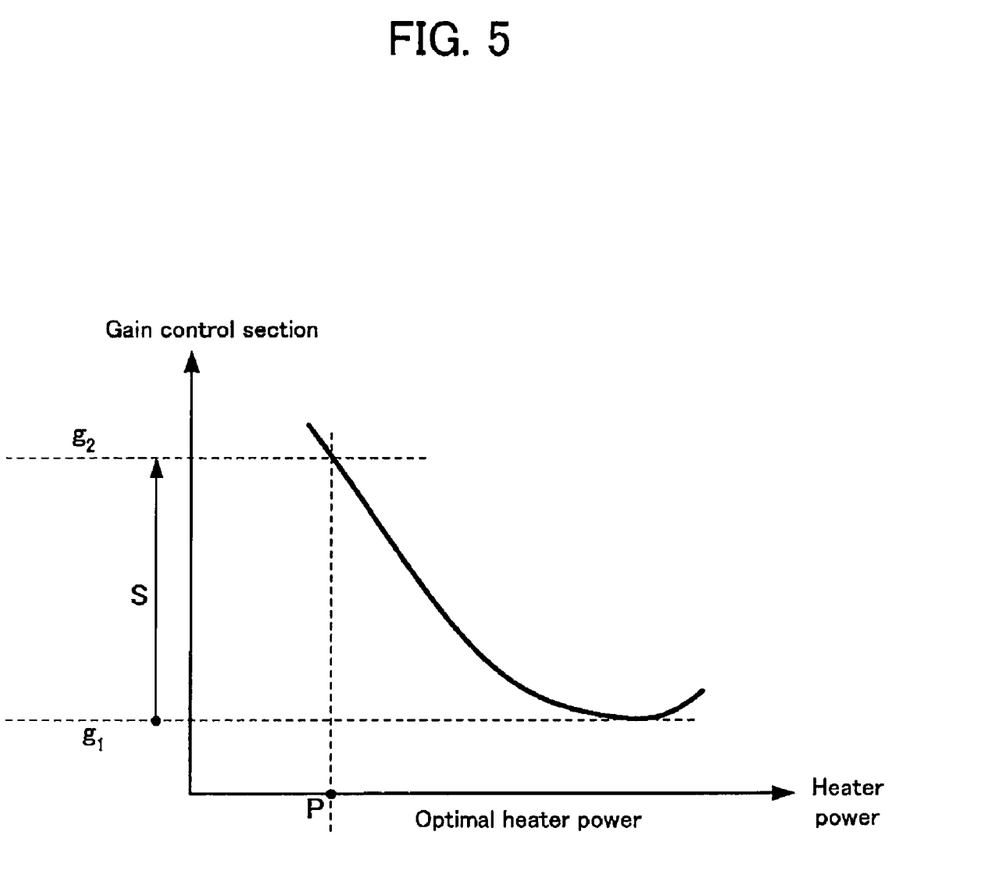
FIG. 5 is a graph showing a relation between supply power to a heater and a gain control value controlled by a gain controller.

FIG. 5 is a graph showing a relation between supply power to the heater 230 and a gain control value controlled by the gain controller 330.

In a state of not being heated by the heater 230, the magnetic head 109 widely floats with respect to the magnetic disk 1, and when supply power to the heater 230 is increased, the magnetic head 109 is thermally expanded and the magnetic head 109 approaches the magnetic disk 1 so that the floating amount is reduced. As a result, as the supply power to the heater 230 is increased as shown in FIG. 5, an amplitude of the input signal IN is increased, and the gain control value is reduced, and when the magnetic head 109 comes into contact with the magnetic disk 1, the gain control value is again increased.

In the floating control section 120, the processing for obtaining a gain control value while increasing the supply power to the heater 230 is repeated until the gain control value is turned to the increasing tendency from the decreasing tendency (i.e., until the magnetic head 109 comes into contact with the magnetic disk 1). Then, a control gain value g1 when the gain control value is changed from a decreasing tendency to a increasing tendency is obtained as a control gain value in the reference position d1 where the magnetic head 109 comes into contact with the magnetic disk 1, and a difference S corresponding to the recording wavelength λ of the magnetic head 109 is obtained from the storage section 122, and a control gain value g2 when $$\text{Control Gain Value } g2 = \text{Difference } S \pm \text{Control Gain Value } g1 \quad (7)$$

is calculated as a control gain value in the target position d2 which is separated from the reference position d1 by a target floating amount D. The heater supply power P in the calculated control gain value g2 is determined as a heater supply power for adjusting the magnetic head 109 to the target floating amount D.

When actually accessing information on the magnetic disk 1, the determined heater supply power is supplied from the power supply section 121 to the heater 230 by instructions from the floating control section 120, the floating amount of the magnetic head 109 is adjusted and then information reading or writing is performed.

Thus, according to the embodiment, it is possible to calculate supply power to the heater quickly and precisely, saving the logarithm calculation having a large amount of calculations so that a floating amount of the magnetic head is precisely adjusted.

In addition, in the above description, the difference value between the gain control value when the head comes into contact with the recording medium and the gain control value when the head floats from the magnetic head by a target floating amount is calculated using the target floating amount. Alternatively, the difference value may be obtained by actually measuring the gain control value while varying the supply power to the heater.

As described above, according to the embodiment of the information access device, it is possible to easily and precisely calculate the supply power to the heater and to set the floating amount of the head to the target floating amount.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An information access device comprising:
   a recording medium in which information is recorded;
   a head comprising a heater and configured to float from the recording medium, and to read information recorded in the recording medium in order to obtain an analog signal, a floating amount of the head being controlled by thermal expansion of heat of the heater;
   a read channel including:
   a gain variable amplifier configured to amplify the analog signal by exponentially multiplying the analog signal by a gain control value;
   a gain controller configured to control the gain control value such that the analog signal output from the gain variable amplifier becomes equal to an analog signal of a predetermined amplitude; and
   an A/D converter configured to convert the analog signal output from the gain variable amplifier into a digital signal;
   a power supply configured to supply power to the heater;
   a floating amount controller configured to control a floating amount of the head to a target floating amount by controlling power supplied from the power supply to the heater; and
   a difference value storage configured to store a difference value between a gain control value when the head comes into contact with the recording medium and a gain control value when the head floats with respect to the recording medium by a target floating amount, wherein
   the floating amount controller is configured to control the power supplied to the heater in order to cause the head to temporarily contact the recording medium, to obtain a first gain control value adjusted by the gain controller at the time of contact, and to obtain from the first gain control value and the difference value a second gain control value by which the gain controller controls when the head floats from the recording medium by the target floating amount, and
   the floating amount controller is configured to control the power supplied to the heater such that the second gain control value is supplied to the gain variable amplifier by the gain controller.

2. The information access device according to claim 1, wherein the difference value (G1−G2) is calculated by the following equation:

$$\Delta d = (\lambda/2\pi) \times (G1 - G2) \times \text{Ln}(b)$$

wherein Δd represents the target floating amount, λ represents a recording wavelength, G1 represent a gain control value when the head comes into contact with the recording medium, and G2 represents a gain control value when the head floats with respect to the recording medium by the target floating amount Δd.

3. A floating amount control method for controlling a floating amount of a head from a recording medium in an information access device that includes:

a recording medium in which information is recorded;

a head comprising a heater and configured to float from the recording medium, and to read information recorded in the recording medium in order to obtain an analog signal, a floating amount of the head being controlled by thermal expansion of heat of the heater;

a read channel including:

a gain variable amplifier configured to amplify the analog signal by exponentially multiplying the analog signal by a gain control value;

a gain controller configured to control the gain control value such that the analog signal output from the gain variable amplifier becomes equal to an analog signal of a predetermined amplitude; and an A/D converter configured to convert the analog signal output from the gain variable amplifier into a digital signal; and a power supply configured to supply power to the heater, the floating amount control method comprising:

controlling the power supplied to the heater in order to obtain a difference value between a gain control value to be adjusted in the gain controller when the head is caused to be contacted with the recording medium and a gain control value to be adjusted in the gain controller when the head floats with respect to the recording medium by a target floating amount;

controlling the power supplied to the heater in order to cause the head to temporarily contact the recording medium;

obtaining a first gain control value adjusted by the gain controller at the time of contact;

obtaining from the first gain control value and the difference value a second gain control value by which the gain controller controls when the head floats with respect to the recording medium by the target floating amount; and controlling the power supplied to the heater such that the second gain control value is supplied to the gain variable amplifier by the gain controller.

4. The floating amount control method according to claim 3, wherein in the preparing step, the difference value (G1−G2) is calculated by the following equation:

$$\Delta d = (\lambda/2\pi) \times (G1 - G2) \times \mathrm{Ln}(b)$$

wherein $\Delta d$ represents the target floating amount, $\lambda$ represents a recording wavelength, G1 represent a gain control value when the head comes into contact with the recording medium, and G2 represents a gain control value when the head floats with respect to the recording medium by the target floating amount $\Delta d$.

* * * * *